US010820342B2

(12) United States Patent
Al-Imari et al.

(10) Patent No.: US 10,820,342 B2
(45) Date of Patent: Oct. 27, 2020

(54) METHOD AND APPARATUS FOR FLEXIBLE SCHEDULING OF UPLINK TRANSMISSIONS IN MOBILE COMMUNICATIONS

(71) Applicant: MediaTek Singapore Pte. Ltd., Singapore (SG)

(72) Inventors: Mohammed S Aleabe Al-Imari, Cambridge (GB); Ahmet Umut Ugurlu, Cambridge (GB)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/272,591

(22) Filed: Feb. 11, 2019

(65) Prior Publication Data

US 2019/0254067 A1    Aug. 15, 2019

Related U.S. Application Data

(60) Provisional application No. 62/635,637, filed on Feb. 27, 2018, provisional application No. 62/629,741, filed on Feb. 13, 2018.

(51) Int. Cl.
*H04W 74/00* (2009.01)
*H04W 72/14* (2009.01)
*H04W 72/12* (2009.01)

(52) U.S. Cl.
CPC ..... *H04W 74/006* (2013.01); *H04W 72/1268* (2013.01); *H04W 72/14* (2013.01)

(58) Field of Classification Search
None
See application file for complete search history.

(56) References Cited

U.S. PATENT DOCUMENTS

2016/0127999 A1*  5/2016  Li .................... H04L 5/1469
                                                     370/294
2018/0035332 A1   2/2018  Agiwal et al.
(Continued)

FOREIGN PATENT DOCUMENTS

EP          3270534 A1    1/2018
KR       10-1605843 B1    3/2016
(Continued)

OTHER PUBLICATIONS

China National Intellectual Property Administration, International Search Report and Written Opinion for International Patent Application No. PCT/CN2019/074939, dated May 8, 2019.
(Continued)

*Primary Examiner* — Noel R Beharry
*Assistant Examiner* — Pamit Kaur
(74) *Attorney, Agent, or Firm* — Han IP PLLC; Andy M. Han

(57) ABSTRACT

Various solutions for flexible scheduling of uplink transmissions with respect to user equipment and network apparatus in mobile communications are described. An apparatus may receive a first downlink control information (DCI) scheduling an uplink transmission. The apparatus may receive a second DCI to cancel the uplink transmission. The apparatus may cancel at least a part of the uplink transmission. The first DCI may comprise a first hybrid automatic repeat request (HARQ) process identification (ID). The second DCI may comprise a second HARQ process ID. The second HARQ process ID may be identical to the first HARQ process ID.

20 Claims, 6 Drawing Sheets

(56) References Cited

U.S. PATENT DOCUMENTS

2018/0110084 A1* 4/2018 Dinan .................. H04W 48/12
2018/0332608 A1* 11/2018 Guo .................. H04W 72/1289
2019/0104541 A1* 4/2019 Lee ....................... H04W 76/11
2019/0159253 A1* 5/2019 Koorapaty ........ H04W 74/0808

FOREIGN PATENT DOCUMENTS

WO    WO 2017195653 A1    11/2017
WO    WO 2018021834 A1    2/2018

OTHER PUBLICATIONS

Vivo, Multiplexing data with different transmission durations, 3GPP TSG RAN WG1 Meeting 90bis, Prague, Czech Republic, Oct. 9-13, 2017.

Taiwan Intellectual Property Office, Office Action for Taiwan Patent Application No. 108104762, dated Apr. 20, 2020.

* cited by examiner

METHOD AND APPARATUS FOR FLEXIBLE SCHEDULING OF UPLINK TRANSMISSIONS IN MOBILE COMMUNICATIONS

CROSS REFERENCE TO RELATED PATENT APPLICATION(S)

The present disclosure claims the priority benefit of U.S. Provisional Patent Application No. 62/629,741, filed 13 Feb. 2018, and U.S. Provisional Patent Application No. 62/635,637, filed 27 Feb. 2018. The contents of aforementioned applications are herein incorporated by reference in their entirety.

TECHNICAL FIELD

The present disclosure is generally related to mobile communications and, more particularly, to flexible scheduling of uplink transmissions with respect to user equipment and network apparatus in mobile communications.

BACKGROUND

Unless otherwise indicated herein, approaches described in this section are not prior art to the claims listed below and are not admitted as prior art by inclusion in this section.

In wireless communications systems, a plurality of user equipment (UE) may be configured with different services. Some services may require strict low latency and high reliability traffic. For example, in New Radio (NR), ultra-reliable and low latency communications (URLLC) is supported for emerging applications that demands high requirements on end-to-end latency and reliability. A general URLLC reliability requirement for one transmission of a packet is $1$-$10^{-5}$ for 32 bytes with a user plane latency of 1 ms. For URLLC, the target for user plane latency should be 0.5 ms for uplink and 0.5 ms for downlink. On the other hand, some services may require high data rates across a wide coverage area and less stringent latency. For example, in NR, Enhanced Mobile Broadband (eMBB) is supported for massive data transmissions. Within the wireless communications systems, these UEs with different service requirements may need to share limited time/frequency resources within the communications systems.

When multiple UEs with different service requirements request access to some uplink resources, the network apparatus may need to allocate radio resources to each of the UEs. Generally, the network apparatus may send uplink grants depending on the order of the requests from the multiple UEs. When the requests from the UEs with more stringent requirements (e.g., URLLC UEs) arrive after the requests from other UEs (e.g., eMBB UEs), the network apparatus may need to prioritize the requests from the UEs with more stringent requirements. Otherwise, the requirements of the UEs with stringent requirements may not be met. However, the network apparatus may already allocate some radio resources to other UEs previously. There may exist conflicts if the same radio resources need to be allocated to the UEs with stringent requirements.

Accordingly, how to modify the allocated uplink resources to avoid conflicts or collisions between the UEs with different requirements may become important in the newly developed communication systems. Therefore, it is needed to provide flexible scheduling schemes for adaptively allocating uplink transmissions.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to flexible scheduling of uplink transmissions with respect to user equipment and network apparatus in mobile communications.

In one aspect, a method may involve an apparatus receiving a first downlink control information (DCI) scheduling an uplink transmission. The method may also involve the apparatus receiving a second DCI to cancel the uplink transmission. The method may further involve the apparatus cancelling at least a part of the uplink transmission. The first DCI may comprise a first hybrid automatic repeat request (HARQ) process identification (ID). The second DCI may comprise a second HARQ process ID. The second HARQ process ID may be identical to the first HARQ process ID.

In one aspect, an apparatus may comprise a transceiver capable of wirelessly communicating with a network node of a wireless network. The apparatus may also comprise a processor communicatively coupled to the transceiver. The processor may be capable of receiving a first DCI scheduling an uplink transmission. The processor may also be capable of receiving a second DCI to cancel the uplink transmission. The processor may further be capable of cancelling at least a part of the uplink transmission. The first DCI may comprise a first HARQ process ID. The second DCI may comprise a second HARQ process ID. The second HARQ process ID may be identical to the first HARQ process ID.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to flexible scheduling of uplink transmissions with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In wireless communications systems, a plurality of UEs may be configured with different services. Some services may require strict low latency and high reliability traffic (e.g., URLLC). Some services may require high data rates across a wide coverage area (e.g., eMBB). These UEs with different service requirements may need to share limited time/frequency resources within the communications systems.

When multiple UEs with different service requirements request access to some uplink resources, the network apparatus may need to allocate radio resources to each of the UEs. Generally, the network apparatus may send uplink grants depending on the order of the requests from the multiple UEs. When the requests from the UEs with more stringent requirements (e.g., URLLC UEs) arrive after the requests from other UEs (e.g., eMBB UEs), the network apparatus may need to prioritize the requests from the UEs with more stringent requirements. Otherwise, the requirements of the UEs with stringent requirements may not be met. However, the network apparatus may already allocate some radio resources to other UEs previously. There may exist conflicts if the same radio resources need to be allocated to the UEs with stringent requirements.

Figure 1:
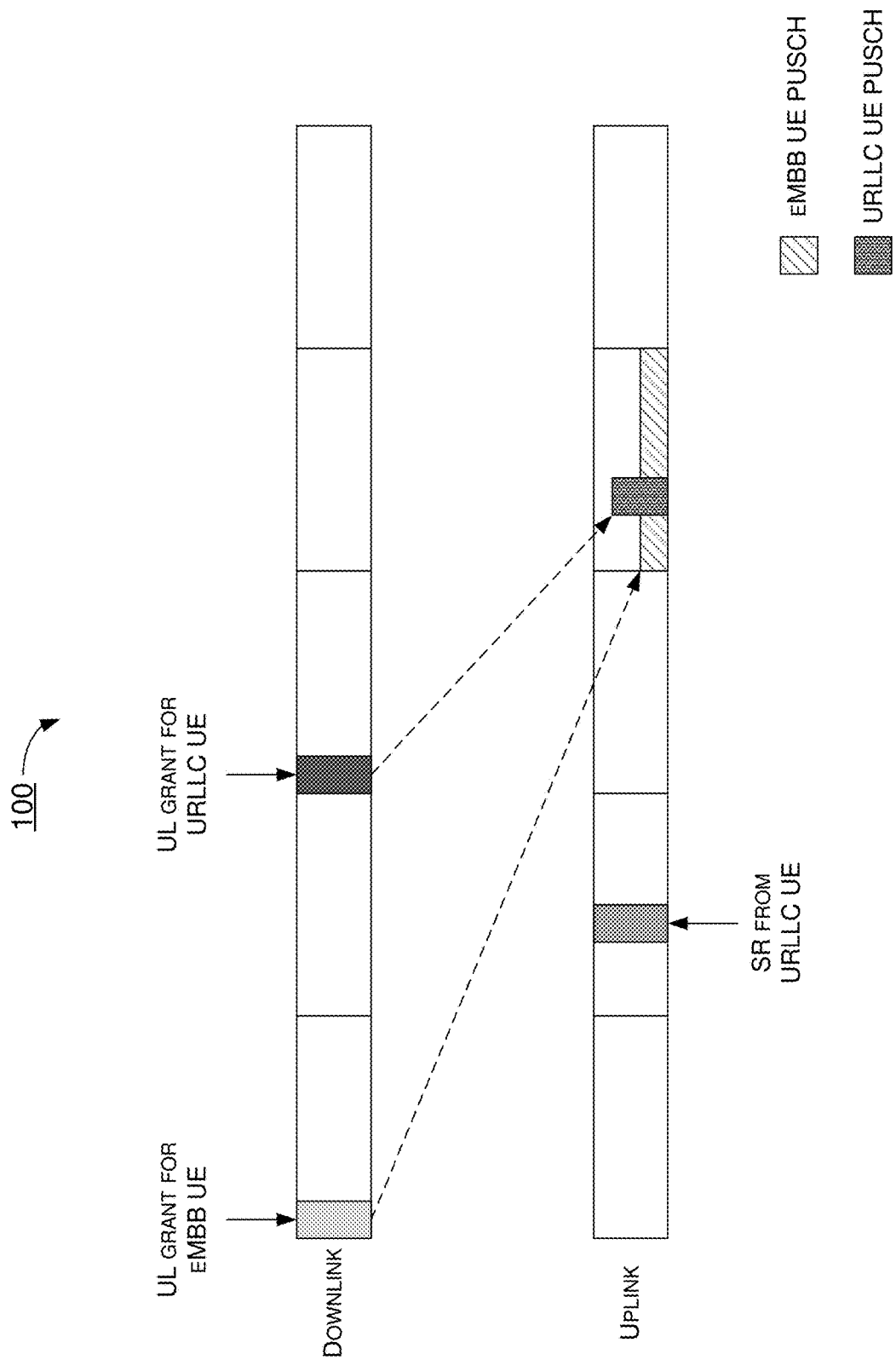
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a plurality of UEs and a network apparatus, which may be a part of a wireless communication network (e.g., an LTE network, an LTE-Advanced network, an LTE-Advanced Pro network, a 5G network, an NR network, an IoT network or an NB-IoT network). The network apparatus may receive scheduling requests (SRs) or service requests from the UEs with less stringent latency requirements (e.g., eMBB UEs) first. The network apparatus may allocate uplink resources (e.g., physical uplink shared channel (PUSCH)) to the eMBB UEs. Then, the network apparatus may further receive SRs from the UEs with low latency traffic requirement (e.g., URLLC UEs). The network apparatus may need to urgently allocate uplink resources (e.g., PUSCH) to the URLLC UEs. However, most likely all the resources have been allocated to the eMBB UEs. Due to the strict latency requirements of URLLC, a packet that arrives in uplink is desirable to be assigned resources as quickly as possible. It is very likely that the network may not have any free resources immediately available at any given time due to spectrum scarcity. Under such scenario, the network apparatus may wait until the eMBB UEs finish their UL transmissions. This may cause extra latency to those URLLC UEs. Alternatively, the network apparatus may allocate the same resources to the URLLC UEs that collide with the eMBB UEs. This may lead to reliability issues due to the interference from the eMBB UE PUSCH to the URLLC UE PUSCH.

In view of the above, the present disclosure proposes a number of schemes to support flexible scheduling schemes to enable the network apparatus to cancel/modify previous scheduling decisions with respect to the UE and the network apparatus. According to the schemes of the present disclosure, the network apparatus may be able to cancel/modify whole or part of a previously scheduled uplink grant either prior to or during an ongoing transmission on some resources allocated by the same uplink grant.

Figure 2:
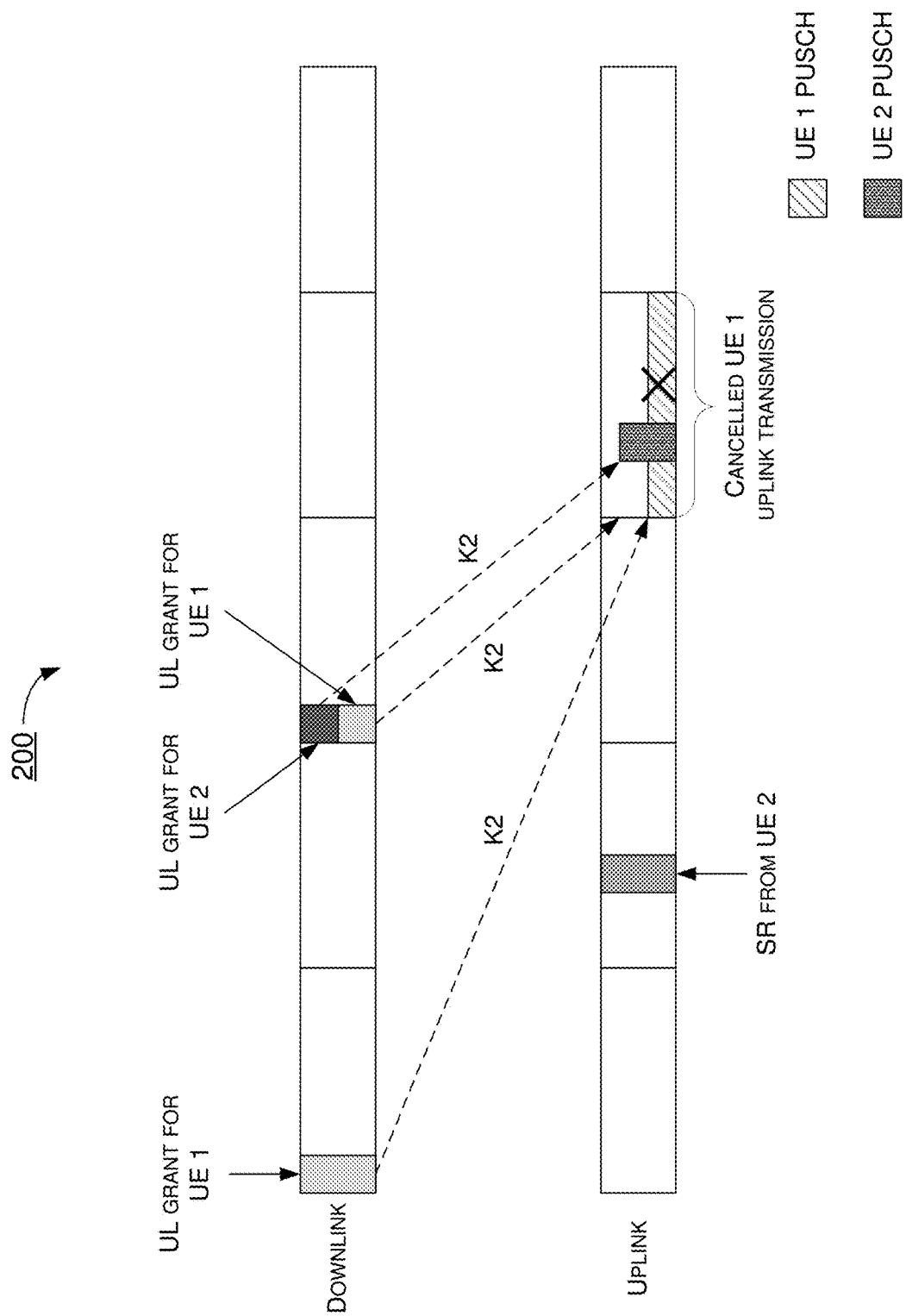
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a plurality of UEs (e.g., UE 1 and UE 2) and a network apparatus, which may be a part of a wireless communication network (e.g., an LTE network, an LTE-Advanced network, an LTE-Advanced Pro network, a 5G network, an NR network, an IoT network or an NB-IoT network). UE 1 may be configured to camp on the network apparatus and configured with less stringent latency requirements (e.g., eMBB services). UE 2 may be configured to camp on the network apparatus and configured with low latency requirements (e.g., URLLC services). UE 1 may previously transmit an SR to the network apparatus. The network apparatus may transmit a first DCI scheduling an uplink transmission to UE 1. The first DCI may comprise a first uplink (UL) grant indicating uplink resources for UE 1 (e.g., UE 1 PUSCH). The first DCI may comprise a first HARQ process ID corresponding to the first uplink grant.

After allocating the first uplink grant for UE 1, the network apparatus may receive an SR from UE 2. Since the latency requirement of UE 2 is more stringent than UE 1, the network apparatus need to urgently allocate uplink resources for UE 2. The network apparatus may be configured to transmit a DCI scheduling an uplink transmission to UE 2. The DCI may comprise an uplink grant indicating uplink resources for UE 2 (e.g., UE 2 PUSCH). However, the uplink resources for UE 2 may be partially or wholly overlapped with the uplink resources for UE 1 in time domain or frequency domain. In order to avoid interferences or collisions, the network apparatus may be configured to cancel the previous uplink grant scheduled for UE 1.

Specifically, the network apparatus may be configured to further transmit a second DCI to UE 1 to cancel/stop/suspend the scheduled uplink transmission. The second DCI may comprise a second uplink grant with the same HARQ process ID. The second uplink grant may be a normal uplink grant. For example, the second DCI may comprise a second HARQ process ID corresponding to the second uplink grant. The second HARQ process ID may be identical to the first HARQ process ID. The second DCI may further comprise a new data indicator (NDI) to indicate whether there is new data scheduled for UE 1.

Upon receiving the second DCI, UE 1 may be configured to determine whether the second HARQ process ID in the second DCI is identical to the first HARQ process ID in the first DCI. UE 1 may further be configured to determine whether the NDI is toggled. In an event that the HARQ process ID is the same and there is no new data (e.g., NDI is not toggled), UE 1 may be configured to determine that the second DCI is used to cancel the scheduled uplink transmission. UE 1 may interpret the second uplink grant to be intended for the cancellation of the first uplink grant with the same HARQ ID. Accordingly, UE 1 may be configured to cancel the scheduled uplink transmission (e.g., UE 1 PUSCH). UE 1 may not transmit any uplink data to the network apparatus.

In some implementations, the second uplink grant may be based on the same or different DCI format compared to the first uplink grant. All the DCI contents of the second DCI may be kept the same as the DCI contents of the first DCI. In such case, UE 1 may be configured to ignore the DCI information apart from the HARQ process ID and the NDI. Alternatively, some of the DCI contents may be altered. For example, the slot number indication (e.g., K2) in the second DCI may be configured to point to the same slot in the first DCI.

Alternatively, the second uplink grant may be a cancelling uplink grant. The network apparatus may be configured to transmit the cancelling uplink grant to UE 1 with the same HARQ process ID and the NDI. Some of the DCI fields of the second DCI may be modified to indicate UE 1 that this is the cancelling uplink grant. UE 1 may be able to distinguish the cancelling uplink grant from the normal uplink grant based on the information in a single field or multiple fields in addition to the HARQ process ID and the NDI fields in the DCI contents. For example, these fields may be time-domain resource assignment (RA), frequency-domain RA, or both time-domain RA and frequency-domain RA fields together. The modified fields for the time-domain RA and/or frequency-domain RA may be set to all '1's or all '0's to minimize detection errors. In addition, any of the other fields in the second DCI may also be modified in a unique way to indicate UE 1 that this is a cancelling uplink grant.

The second DCI or the cancelling uplink grant in scenario 200 may not grant UE 1 with alternative resources. After receiving the second DCI, UE 1 may solely cancel the scheduled uplink transmission without further transmission for the uplink data. In some implementations, the network apparatus may further transmit a new DCI with a new uplink grant (e.g., normal uplink grant) to UE 1 later to grant other resources in uplink. UE 1 may be able to transmit the uplink data based on the new uplink grant.

Figure 3:
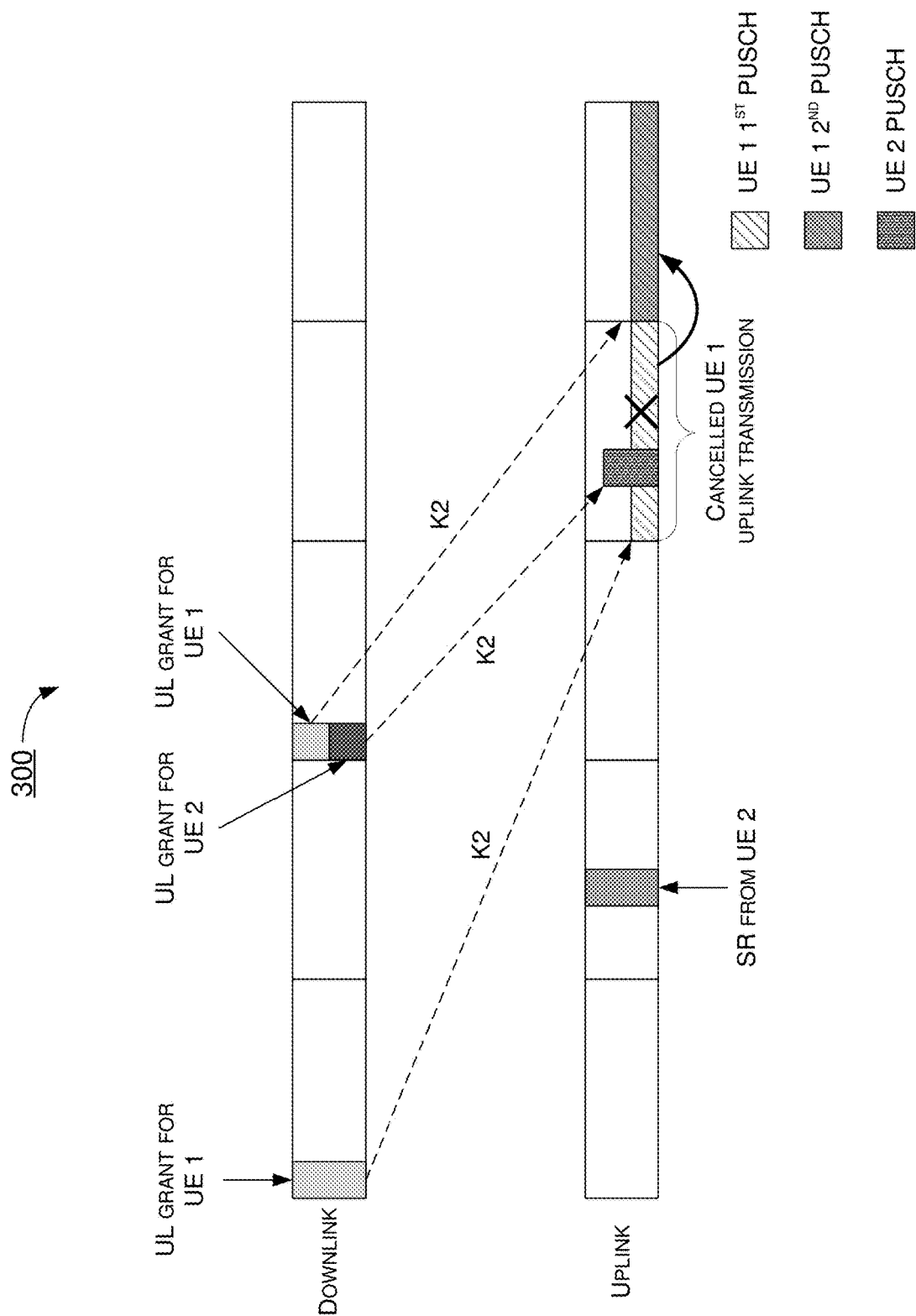
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a plurality of UEs (e.g., UE 1 and UE 2) and a network apparatus, which may be a part of a wireless communication network (e.g., an LTE network, an LTE-Advanced network, an LTE-Advanced Pro network, a 5G network, an NR network, an IoT network or an NB-IoT network). Similarly, UE 1 may previously transmit an SR to the network apparatus. The network apparatus may transmit a first DCI scheduling an uplink transmission to UE 1. The first DCI may comprise a first uplink grant indicating uplink resources for UE 1 (e.g., UE 1 $1^{st}$ PUSCH). The first DCI may comprise a first HARQ process ID corresponding to the first uplink grant.

After allocating the first uplink grant for UE 1, the network apparatus may receive an SR from UE 2. Since the latency requirement of UE 2 is more stringent than UE 1, the network apparatus need to urgently allocate uplink resources for UE 2. The network apparatus may be configured to transmit a DCI scheduling an uplink transmission to UE 2. The DCI may comprise an uplink grant indicating uplink resources for UE 2 (e.g., UE 2 PUSCH). However, the uplink resources for UE 2 may be partially or wholly overlapped with the uplink resources for UE 1 in time domain or frequency domain. In scenario 300, in addition to cancelling the previous uplink grant, the network apparatus may further reschedule a new uplink grant to UE 1.

Specifically, the network apparatus may be configured to transmit a second DCI to UE 1 to reschedule the scheduled uplink transmission. The second DCI may comprise a second uplink grant with the same HARQ process ID. The second uplink grant may be a rescheduling uplink grant indicating new uplink resources for UE 1 (e.g., UE 1 $2^{nd}$ PUSCH). For example, the second DCI may comprise a second HARQ process ID corresponding to the second uplink grant. The second HARQ process ID may be identical to the first HARQ process ID. The second DCI may further comprise an NDI to indicate whether there is new data scheduled for UE 1. The second DCI may further comprise different scheduling parameters. The different scheduling parameters may comprise, for example and without limitations, a slot number indication (e.g., K0 or K2) pointing to a slot different from the previous grant, a time domain resource allocation different from the previous grant, a frequency domain resource allocation different from the previous grant, a transmit power control (TPC) command different from the previous grant, or any other fields in the scheduling DCI. At least a single parameter or a set of these parameters may be different in the second DCI (e.g., rescheduling DCI) compared to the first DCI that is overwritten.

Upon receiving the second DCI, UE 1 may be configured to determine whether the second HARQ process ID in the second DCI is identical to the first HARQ process ID in the first DCI. UE 1 may also be configured to determine whether the NDI is toggled. UE 1 may further be configured to determine whether the rescheduling uplink grant is received. In an event that the HARQ process ID is the same, there is no new data (e.g., NDI is not toggled) and the rescheduling uplink grant is received, UE 1 may be configured to determine that the second DCI is used to reschedule the scheduled uplink transmission. UE 1 may interpret the second uplink grant to be intended for the cancellation and rescheduling of the first uplink grant with the same HARQ ID. Accordingly, UE 1 may be configured not to transmit the uplink data based on the previous grant (e.g., UE 1 $1^{st}$ PUSCH) and transmit the uplink data according to the rescheduling uplink grant (e.g., UE 1 $2^{nd}$ PUSCH). The second DCI may be used to grant UE 1 with alternative resources in addition to cancelling the previous grant with the same HARQ process ID and NDI.

In some implementations, the second uplink grant may be based on the same or different DCI format compared to the first uplink grant. The second DCI may indicate different resource allocation fields that point to a different slot than before. In such case, uplink multiplexing of URLLC and eMBB may be avoided and hence the PUSCH reliability may be maintained. Alternatively, the second DCI may indicate the same resource allocation fields as before, but a different TPC command. For example, the new TPC command may be matched to a lower transmit power. In such case, uplink multiplexing of URLLC and eMBB may be allowed with reduced/limited PUSCH power for eMBB and hence the impact on URLLC PUSCH reliability may be small.

In some implementations, another DCI field may be used to enable the UE to identify the link between the two uplink grants (e.g., the initial uplink grant and the cancelling/rescheduling uplink grant). For example, in addition to the HARQ process ID, the UE may determine whether the uplink grant is a cancelling/rescheduling uplink grant based on the transport block size. In an event that the initial uplink grant and the cancelling/rescheduling uplink grant have the same HARQ process ID and transport block size with NDI not toggled, the UE may interpret that it is a cancelling/rescheduling uplink grant for the initial one.

Figure 4:
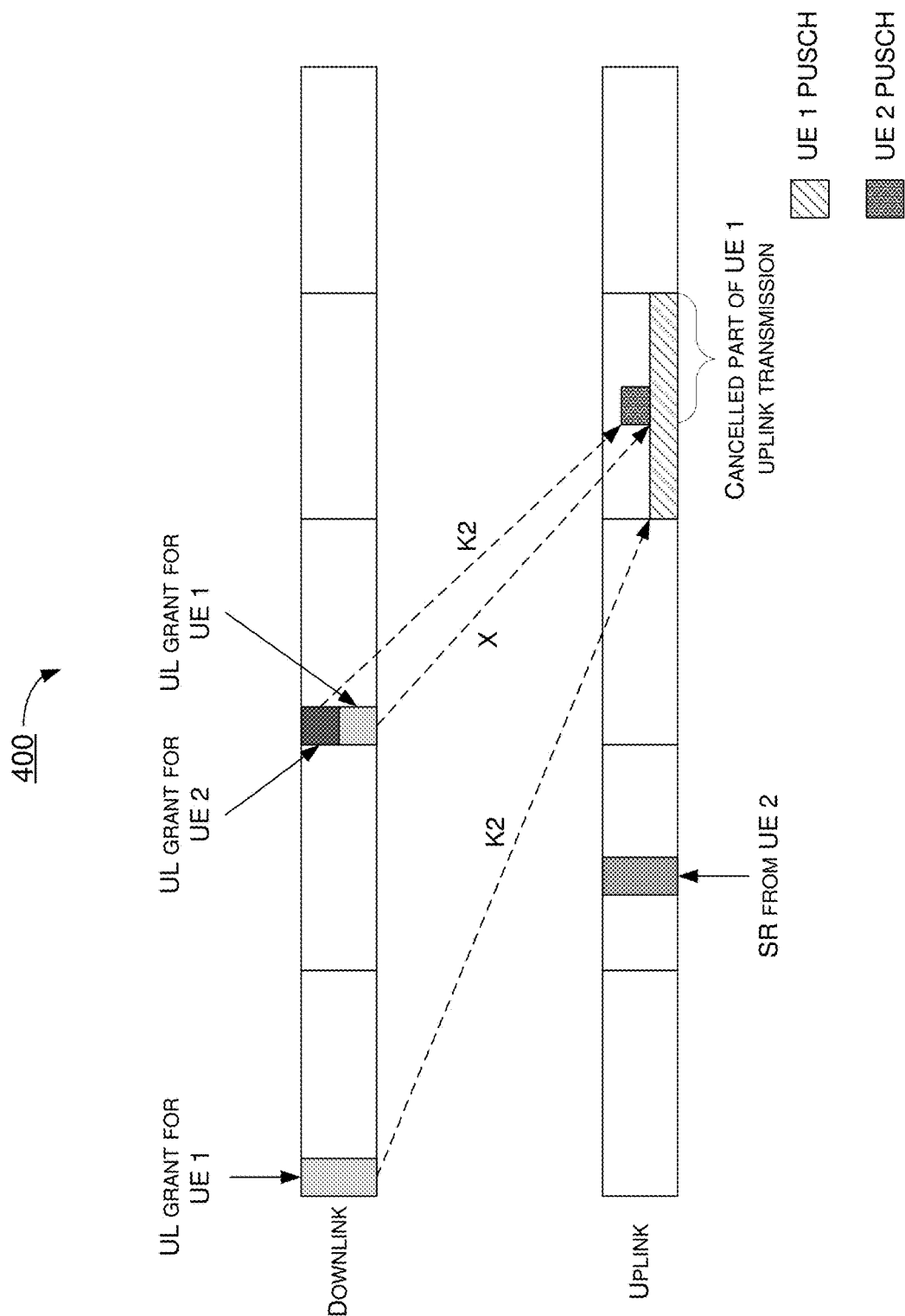
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a plurality of UEs (e.g., UE 1 and UE 2) and a network apparatus, which may be a part of a wireless communication network (e.g., an LTE network, an LTE-Advanced network, an LTE-Advanced Pro network, a 5G network, an NR network, an IoT network or an NB-IoT network). Similarly, UE 1 may be configured to camp on the network apparatus and configured with less stringent latency requirements (e.g., eMBB services). UE 2 may be configured to camp on the network apparatus and configured with low latency requirements (e.g., URLLC services). UE 1 may previously transmit an SR to the network apparatus. The network apparatus may transmit a first DCI scheduling an uplink transmission to UE 1. The first DCI may comprise a first uplink grant indicating uplink resources for UE 1 (e.g., UE 1 PUSCH). The first DCI may comprise a first HARQ process ID corresponding to the first uplink grant.

After allocating the first uplink grant for UE 1, the network apparatus may receive an SR from UE 2. Since the latency requirement of UE 2 is more stringent than UE 1, the network apparatus need to urgently allocate uplink resources for UE 2. The network apparatus may be configured to transmit a DCI scheduling an uplink transmission to UE 2. The DCI may comprise an uplink grant indicating uplink resources for UE 2 (e.g., UE 2 PUSCH). However, the uplink resources for UE 2 may be partially or wholly overlapped with the uplink resources for UE 1 in time domain or frequency domain. In order to avoid interferences or collisions, the network apparatus may be configured to cancel a part of uplink grant previously scheduled for UE 1.

Specifically, the network apparatus may be configured to further transmit a second DCI (e.g., UE-specific DCI) to UE 1 to cancel/stop/suspend part of the scheduled uplink transmission. The previous scheduled uplink transmission may or may not have already started by the time the second DCI is received by UE 1. The second DCI may comprise a second uplink grant with the same HARQ process ID. The second uplink grant may be a normal uplink grant. For example, the second DCI may comprise a second HARQ process ID corresponding to the second uplink grant. The second HARQ process ID may be identical to the first HARQ process ID. The second DCI may further comprise an NDI to indicate whether there is new data scheduled for UE 1.

Upon receiving the second DCI, UE 1 may be configured to determine whether the second HARQ process ID in the second DCI is identical to the first HARQ process ID in the first DCI. UE 1 may further be configured to determine whether the NDI is toggled. In an event that the HARQ process ID is the same and there is no new data (e.g., NDI is not toggled), UE 1 may be configured to determine that the second DCI is used to cancel the scheduled uplink transmission. UE 1 may interpret the second uplink grant to be intended for the cancellation of the first uplink grant with the same HARQ ID. UE 1 may be configured to cancel part of the scheduled uplink transmission (e.g., UE 1 PUSCH). For example, UE 1 may be configured to cancel the associated uplink transmission (based on the HARQ process ID) after a configured number of symbols (e.g., X symbols) from the last symbol (e.g., orthogonal frequency-division multiplexing (OFDM) symbol) of the physical downlink control channel (PDCCH) wherein the second DCI is detected. The value of the configured number of symbols (e.g., X) may be fixed or predetermined. For example, it may be defined in the 3$^{rd}$ Generation Partnership Project (3GPP) specifications or may be configured via higher layer signaling (e.g., radio resource control (RRC) signaling). In another example, it may be indicated by a time domain resource allocation field. Accordingly, UE 1 may perform part of the scheduled uplink transmission and cancel the rest of the scheduled uplink transmission. The conflict of the URLLC transmission and the eMBB transmission may be avoided in view of the cancelled part of the uplink transmission.

In some implementations, the second uplink grant may be based on the same or different DCI format compared to the first uplink grant. All the DCI contents of the second DCI may be kept the same as the DCI contents of the first DCI. In such case, UE 1 may be configured to ignore the DCI information apart from the HARQ process ID and the NDI. Alternatively, some of the DCI contents may be altered to point to the part of the uplink transmission that should be cancelled. For example, the slot number indication (e.g., K2) in the second DCI may be configured to point to the same slot in the first DCI.

In some implementations, the second uplink grant may be a cancelling uplink grant. One or more of the DCI fields of the second DCI may be modified to indicate to UE 1 that this is the cancelling uplink grant. This scheme may be useful for the case when UE 1 missed the previous associated uplink grant (e.g., based on the HARQ process ID). UE 1 may be able to distinguish the cancelling uplink grant from the normal uplink grant based on the information in a single field or multiple fields in addition to the HARQ process ID and the NDI fields in the DCI contents. For example, these fields may be time-domain RA, frequency-domain RA, or both time-domain RA and frequency-domain RA fields together. The modified fields for the time-domain RA and/or frequency-domain RA may be set to all '1's or all '0's to minimize detection errors. In addition, any of the other fields in the second DCI may also be modified in a unique way to indicate to UE 1 that this is a cancelling uplink grant.

The implicit indication of a transmission cancellation/suspension by the second DCI (e.g., UE-specific scheduling DCI) has some advantages over any explicit indication signal that may be transmitted by a new DCI format. For example, the UE blind decoding complexity with the second DCI since it is not a new DCI format. There is no need to define a new radio network temporary identifier (RNTI) or configure a separate search space, hence less UE complexity. The second DCI can point to pre-empted resources with better precision than any group-common DCI carrying an explicit suspending indication. The group-common DCI may cause higher signalling overhead as it needs to be transmitted periodically. Therefore, its size has to be compact, which leads to a lack of precision.

Illustrative Implementations

Figure 5:
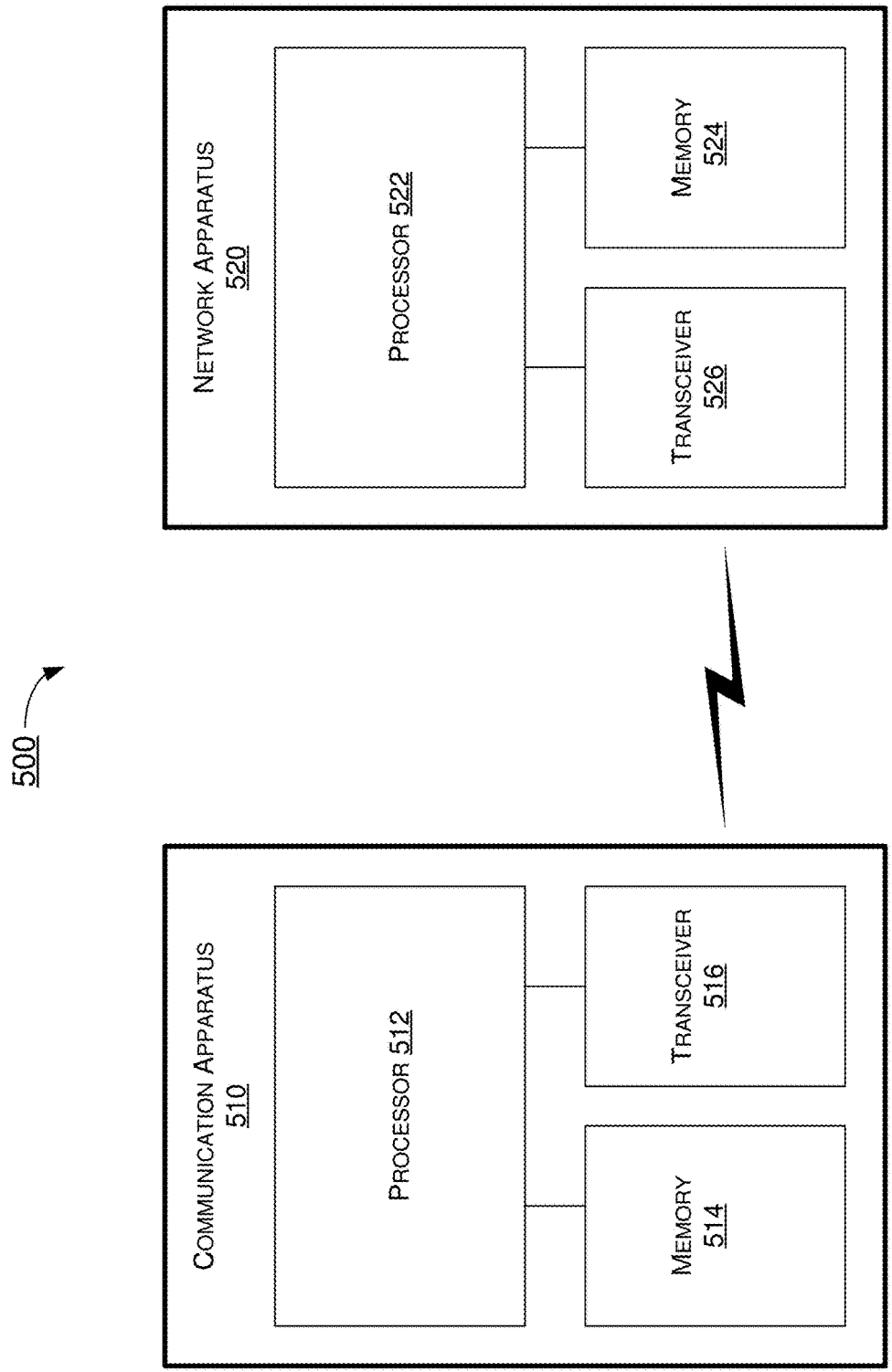
FIG. 5 is a block diagram of an example communication apparatus and an example network apparatus in accordance with an implementation of the present disclosure.

FIG. 5 illustrates an example communication apparatus 510 and an example network apparatus 520 in accordance with an implementation of the present disclosure. Each of communication apparatus 510 and network apparatus 520 may perform various functions to implement schemes, techniques, processes and methods described herein pertaining to flexible scheduling of uplink transmissions with respect to user equipment and network apparatus in wireless communications, including scenarios 200, 300 and 400 described above as well as process 600 described below.

Communication apparatus 510 may be a part of an electronic apparatus, which may be a UE such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer or a notebook computer. Communication apparatus 510 may also be a part of a machine type apparatus, which may be an IoT or NB-IoT apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, communication apparatus 510 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 510 may include at least some of those components shown in FIG. 5 such as a processor 512, for example. communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of an electronic apparatus, which may be a network node such as a base station, a small cell, a router or a gateway. For instance, network apparatus 520 may be implemented in an eNodeB in an LTE, LTE-Advanced or LTE-Advanced Pro network or in a gNB in a 5G, NR, IoT or NB-IoT network. Alternatively, network apparatus 520 may be implemented in the form of one or more IC chips such as, for example and without limitation, one or more single-core processors, one or more multi-core processors, or one or more RISC or CISC processors. Network apparatus 520 may include at least some of those components shown in FIG. 5 such as a processor 522, for example. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more RISC or CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including power consumption reduction in a device (e.g., as represented by communication apparatus 510) and a network (e.g., as represented by network apparatus 520) in accordance with various implementations of the present disclosure.

In some implementations, communication apparatus 510 may also include a transceiver 516 coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein. Accordingly, communication apparatus 510 and network apparatus 520 may wirelessly communicate with each other via transceiver 516 and transceiver 526, respectively. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE and network apparatus 520 is implemented in or as a network node of a communication network.

In some implementations, communication apparatus 510 may be configured to camp on network apparatus 520 and configured with less stringent latency requirements (e.g., eMBB services). There may be another communication apparatus camped on network apparatus 520 and configured with low latency requirements (e.g., URLLC services). Processor 512 may previously transmit, via transceiver 516, an SR to network apparatus 520. Processor 522 may transmit, via transceiver 526, a first DCI scheduling an uplink transmission to communication apparatus 510. The first DCI may comprise a first UL grant indicating uplink resources for communication apparatus 510. The first DCI may comprise a first HARQ process ID corresponding to the first uplink grant.

In some implementations, after allocating the first uplink grant for communication apparatus 510, processor 522 may receive, via transceiver 526, an SR from another communication apparatus. Since the latency requirement of another communication apparatus is more stringent than communication apparatus 510, processor 522 need to urgently allocate uplink resources for another communication apparatus. Processor 522 may be configured to transmit, via transceiver 526, a DCI scheduling an uplink transmission to another communication apparatus. The DCI may comprise an uplink grant indicating uplink resources for another communication apparatus. However, the uplink resources for another communication apparatus may be partially or wholly overlapped with the uplink resources for communication apparatus 510 in time domain or frequency domain. In order to avoid interferences or collisions, processor 522 may be configured to cancel the previous uplink grant scheduled for communication apparatus 510.

In some implementations, processor 522 may be configured to further transmit, via transceiver 526, a second DCI to communication apparatus 510 to cancel/stop/suspend the scheduled uplink transmission. Processor 522 may include a second uplink grant with the same HARQ process ID in the second DCI. The second uplink grant may be a normal uplink grant. For example, processor 522 may include a second HARQ process ID corresponding to the second uplink grant in the second DCI. The second HARQ process ID may be identical to the first HARQ process ID. Processor 522 may further include an NDI in the second DCI to indicate whether there is new data scheduled for communication apparatus 510.

In some implementations, upon receiving the second DCI, processor 512 may be configured to determine whether the second HARQ process ID in the second DCI is identical to the first HARQ process ID in the first DCI. Processor 512 may further be configured to determine whether the NDI is toggled. In an event that the HARQ process ID is the same and there is no new data (e.g., NDI is not toggled), processor 512 may be configured to determine that the second DCI is used to cancel the scheduled uplink transmission. Processor 512 may interpret the second uplink grant to be intended for the cancellation of the first uplink grant with the same HARQ ID. Accordingly, processor 512 may be configured to cancel the scheduled uplink transmission. Processor 512 may not transmit any uplink data to network apparatus 520.

In some implementations, processor 522 may transmit the second uplink grant based on the same or different DCI format compared to the first uplink grant. Processor 522 may keep all the DCI contents of the second DCI to be the same as the DCI contents of the first DCI. In such case, processor 512 may be configured to ignore the DCI information apart from the HARQ process ID and the NDI. Alternatively, processor 522 may alter some of the DCI contents. For example, processor 522 may configure the slot number indication (e.g., K2) in the second DCI to point to the same slot in the first DCI.

In some implementations, the second uplink grant may be a cancelling uplink grant. Processor 522 may be configured to transmit the cancelling uplink grant to communication apparatus 510 with the same HARQ process ID and the NDI. Processor 522 may modify some of the DCI fields of the second DCI to indicate communication apparatus 510 that this is the cancelling uplink grant. Processor 512 may be able to distinguish the cancelling uplink grant from the normal uplink grant based on the information in a single field or multiple fields in addition to the HARQ process ID and the NDI fields in the DCI contents. For example, these fields may be time-domain resource assignment (RA), frequency-domain RA, or both time-domain RA and frequency-domain RA fields together. Processor 522 may set the modified fields for the time-domain RA and/or frequency-domain RA to all '1's or all '0's to minimize detection errors. In addition, processor 522 may modify any of the other fields in the second DCI in a unique way to indicate communication apparatus 510 that this is a cancelling uplink grant.

In some implementations, processor 522 may not grant communication apparatus 510 with alternative resources in the second DCI or the cancelling uplink grant. After receiving the second DCI, processor 512 may solely cancel the scheduled uplink transmission without further transmission for the uplink data. In some implementations, processor 522 may further transmit a new DCI with a new uplink grant (e.g., normal uplink grant) to communication apparatus 510 later to grant other resources in uplink. Processor 512 may be able to transmit the uplink data based on the new uplink grant.

In some implementations, in addition to cancelling the previous uplink grant, processor 522 may further reschedule a new uplink grant to communication apparatus 510. Processor 522 may be configured to transmit a second DCI to communication apparatus 510 to reschedule the scheduled uplink transmission. Processor 522 may include a second uplink grant with the same HARQ process ID in the second DCI. Processor 522 may use the second uplink grant as a rescheduling uplink grant indicating new uplink resources for communication apparatus 510. For example, processor 522 may include a second HARQ process ID corresponding to the second uplink grant in the second DCI. The second HARQ process ID may be identical to the first HARQ process ID. Processor 522 may further include may further comprise an NDI in the second DCI to indicate whether there is new data scheduled for communication apparatus 510. Processor 522 may further include different scheduling parameters in the second DCI. The different scheduling parameters may comprise, for example and without limitations, a slot number indication (e.g., K0 or K2) pointing to a slot different from the previous grant, a time domain resource allocation different from the previous grant, a frequency domain resource allocation different from the previous grant, a TPC command different from the previous grant, or any other fields in the scheduling DCI. At least a single parameter or a set of these parameters may be different in the second DCI (e.g., rescheduling DCI) compared to the first DCI that is overwritten.

In some implementations, upon receiving the second DCI, processor 512 may be configured to determine whether the second HARQ process ID in the second DCI is identical to the first HARQ process ID in the first DCI. Processor 512 may also be configured to determine whether the NDI is toggled. Processor 512 may further be configured to determine whether the rescheduling uplink grant is received. In an event that the HARQ process ID is the same, there is no new data (e.g., NDI is not toggled) and the rescheduling uplink grant is received, processor 512 may be configured to determine that the second DCI is used to reschedule the scheduled uplink transmission. Processor 512 may interpret the second uplink grant to be intended for the cancellation and rescheduling of the first uplink grant with the same HARQ ID. Accordingly, processor 512 may be configured not to transmit the uplink data based on the previous grant and transmit the uplink data according to the rescheduling uplink grant. Processor 522 may use the second DCI to grant communication apparatus 510 with alternative resources in addition to cancelling the previous grant with the same HARQ process ID and NDI.

In some implementations, processor 522 may indicate different resource allocation fields in the second DCI that point to a different slot than before. Alternatively, processor 522 may indicate the same resource allocation fields as before, but a different TPC command in the second DCI. For example, the new TPC command may be matched to a lower transmit power.

In some implementations, processor 522 may use another DCI field enable communication apparatus 510 to identify the link between the two uplink grants (e.g., the initial uplink grant and the cancelling/rescheduling uplink grant). For example, in addition to the HARQ process ID, processor 512 may determine whether the uplink grant is a cancelling/rescheduling uplink grant based on the transport block size. In an event that the initial uplink grant and the cancelling/rescheduling uplink grant have the same HARQ process ID and transport block size with NDI not toggled, processor 512 may interpret that it is a cancelling/rescheduling uplink grant for the initial one.

In some implementations, processor 522 may be configured to cancel a part of uplink grant previously scheduled for communication apparatus 510. Processor 522 may be configured to further transmit a second DCI (e.g., UE-specific DCI) to communication apparatus 510 to cancel/stop/suspend part of the scheduled uplink transmission. The previous scheduled uplink transmission may or may not have already started by the time the second DCI is received by communication apparatus 510. Processor 522 may include a second uplink grant with the same HARQ process ID in the second DCI. The second uplink grant may be a normal uplink grant. For example, processor 522 may include a second HARQ process ID corresponding to the second uplink grant in the second DCI. The second HARQ process ID may be identical to the first HARQ process ID. Processor 522 may further include an NDI in the second DCI to indicate whether there is new data scheduled for communication apparatus 510.

In some implementations, upon receiving the second DCI, processor 512 may be configured to determine whether the second HARQ process ID in the second DCI is identical to the first HARQ process ID in the first DCI. Processor 512 may further be configured to determine whether the NDI is toggled. In an event that the HARQ process ID is the same and there is no new data (e.g., NDI is not toggled), processor 512 may be configured to determine that the second DCI is used to cancel the scheduled uplink transmission. Processor 512 may interpret the second uplink grant to be intended for the cancellation of the first uplink grant with the same HARQ ID. Processor 512 may be configured to cancel part of the scheduled uplink transmission. For example, processor 512 may be configured to cancel the associated uplink transmission (based on the HARQ process ID) after a configured number of symbols (e.g., X symbols) from the last symbol (e.g., OFDM symbol) of the PDCCH wherein the second DCI is detected. Accordingly, processor 512 may perform part of the scheduled uplink transmission and cancel the rest of the scheduled uplink transmission.

Illustrative Processes

Figure 6:
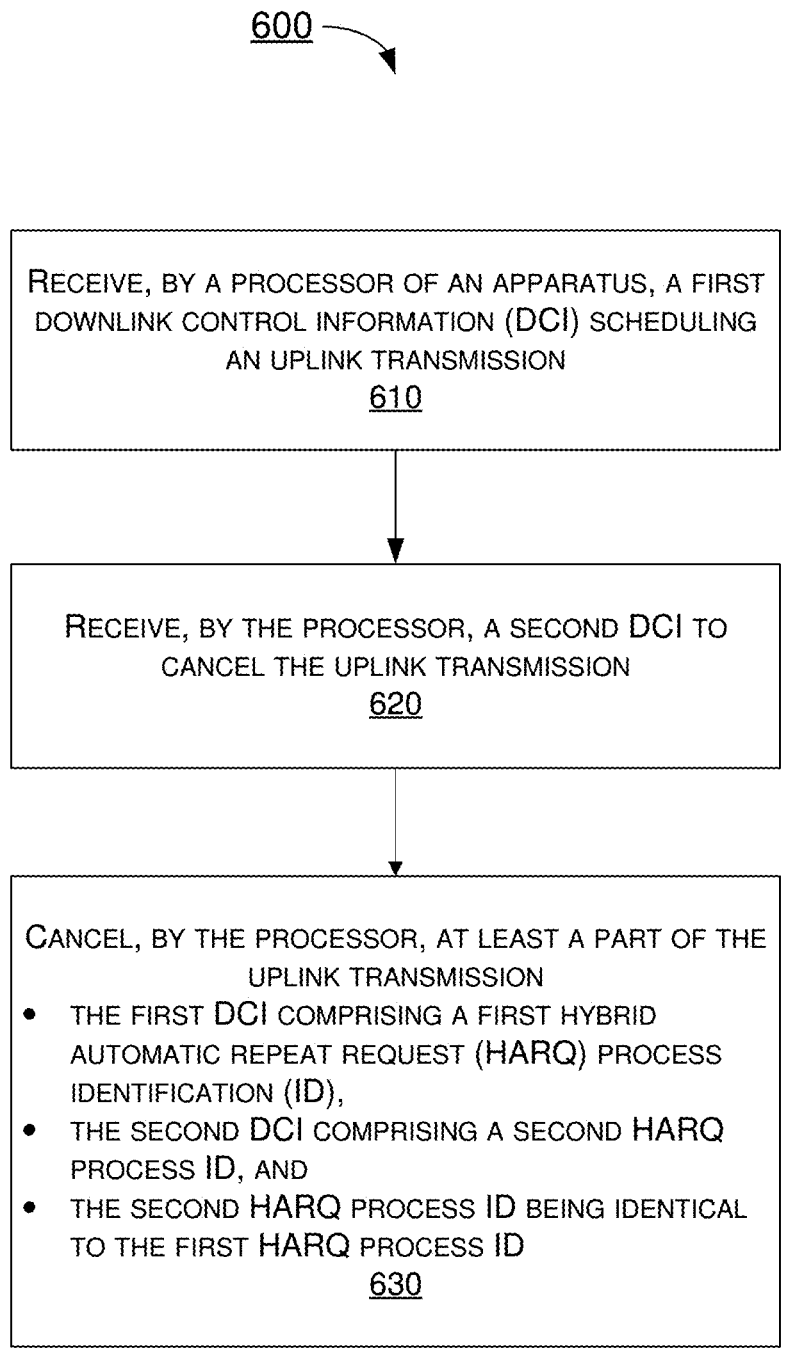
FIG. 6 is a flowchart of an example process in accordance with an implementation of the present disclosure.

FIG. 6 illustrates an example process 600 in accordance with an implementation of the present disclosure. Process 600 may be an example implementation of scenarios 200, 300 and 400, whether partially or completely, with respect to flexible scheduling of uplink transmissions with the present disclosure. Process 600 may represent an aspect of implementation of features of communication apparatus 510. Process 600 may include one or more operations, actions, or functions as illustrated by one or more of blocks 610, 620 and 630. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by communication apparatus 510 or any suitable UE or machine type devices. Solely for illustrative purposes and without limitation, process 600 is described below in the context of communication apparatus 510. Process 600 may begin at block 610.

At 610, process 600 may involve processor 512 of apparatus 510 receiving a first DCI scheduling an uplink transmission. Process 600 may proceed from 610 to 620.

At 620, process 600 may involve processor 512 receiving a second DCI to cancel the uplink transmission. Process 600 may proceed from 620 to 630.

At 630, process 600 may involve processor 512 cancelling at least a part of the uplink transmission. The first DCI may comprise a first HARQ process ID. The second DCI may comprise a second HARQ process ID. The second HARQ process ID may be identical to the first HARQ process ID.

In some implementations, the second DCI may further comprise an NDI. Process 600 may involve processor 512 determining that the second HARQ process ID is identical to the first HARQ process ID. Process 600 may also involve processor 512 determining whether the NDI is toggled. Process 600 may further involve processor 512 determining that the second DCI is used to cancel the uplink transmission in an event that the NDI is not toggled.

In some implementations, the DCI contents of the second DCI may be identical to the DCI contents of the first DCI.

In some implementations, a part of DCI contents of the second DCI may be different from the DCI contents of the first DCI.

In some implementations, the second DCI may further comprise a rescheduling uplink grant. Process 600 may involve processor 512 determining whether the rescheduling uplink grant is received. Process 600 may also involve processor 512 transmitting uplink data according to the rescheduling uplink grant in an event that the rescheduling uplink grant is received.

In some implementations, the rescheduling uplink grant may indicate a different slot to transmit the uplink data.

In some implementations, the rescheduling uplink grant may indicate a different transmit power to transmit the uplink data.

In some implementations, process 600 may involve processor 512 identifying that the second DCI is used to cancel the uplink transmission according to at least one DCI field of the second DCI.

In some implementations, process 600 may involve processor 512 cancelling at least a part of the uplink transmission after a configured number of symbols from receiving the second DCI.

In some implementations, process 600 may involve processor 512 performing a part of the uplink transmission before cancelling the other part of the uplink transmission.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, a first downlink control information (DCI) scheduling an uplink transmission;
   receiving, by the processor, a second DCI comprising an uplink grant;
   determining, by the processor, whether the uplink grant in the second DCI is a normal uplink grant or a cancelling uplink grant based on information in one or more fields in the second DCI; and
   cancelling, by the processor, at least a part of the uplink transmission responsive to the determining indicating the uplink grant in the second DCI being the cancelling uplink grant,
   wherein the first DCI comprises a first hybrid automatic repeat request (HARQ) process identification (ID), and
   wherein the determining comprises determining based on the information in the one or more fields in the second DCI comprising a second HARQ process ID that is identical to the first HARQ process ID and at least one field of the one or more fields being set to a value indicating the uplink grant in the second DCI as the cancelling uplink grant.

2. The method of claim 1, further comprising:
   determining, by the processor, that the second HARQ process ID is identical to the first HARQ process ID;
   determining, by the processor, whether a new data indicator (NDI) is toggled; and
   determining, by the processor, that the second DCI is used to cancel the uplink transmission in an event that the NDI is not toggled,
   wherein the second DCI further comprises the NDI.

3. The method of claim 1, wherein DCI contents of the second DCI are identical to DCI contents of the first DCI.

4. The method of claim 1, wherein a part of DCI contents of the second DCI is different from DCI contents of the first DCI.

5. The method of claim 1, further comprising:
   determining, by the processor, whether a rescheduling uplink grant is received; and
   transmitting, by the processor, uplink data according to the rescheduling uplink grant in an event that the rescheduling uplink grant is received,
   wherein the second DCI further comprises the rescheduling uplink grant.

6. The method of claim 5, wherein the rescheduling uplink grant indicates a different slot to transmit the uplink data.

7. The method of claim 5, wherein the rescheduling uplink grant indicates a different transmit power to transmit the uplink data.

8. The method of claim 1, further comprising:
   identifying, by the processor, that the second DCI is used to cancel the uplink transmission according to at least one DCI field of the second DCI.

9. The method of claim 1, wherein the cancelling comprises cancelling at least a part of the uplink transmission after a configured number of symbols from receiving the second DCI.

10. The method of claim 1, further comprising:
performing, by the processor, a part of the uplink transmission before the cancelling.

11. An apparatus, comprising:
a transceiver capable of wirelessly communicating with a network node of a wireless network; and
a processor communicatively coupled to the transceiver, the processor capable of:
receiving, via the transceiver, a first downlink control information (DCI) scheduling an uplink transmission;
receiving, via the transceiver, a second DCI comprising an uplink grant;
determining whether the uplink grant in the second DCI is a normal uplink grant or a cancelling uplink grant based on information in one or more fields in the second DCI; and
cancelling at least a part of the uplink transmission responsive to the determining indicating the uplink grant in the second DCI being the cancelling uplink grant,
wherein the first DCI comprises a first hybrid automatic repeat request (HARQ) process identification (ID), and
wherein, in determining, the processor determines based on the information in the one or more fields in the second DCI comprising a second HARQ process ID that is identical to the first HARQ process ID and at least one of the one or more fields being set to a value indicating the uplink grant in the second DCI as the cancelling uplink grant.

12. The apparatus of claim 11, wherein the processor is further capable of:
determining that the second HARQ process ID is identical to the first HARQ process ID;
determining whether a new data indicator (NDI) is toggled; and
determining that the second DCI is used to cancel the uplink transmission in an event that the NDI is not toggled,
wherein the second DCI further comprises the NDI.

13. The apparatus of claim 11, wherein DCI contents of the second DCI are identical to DCI contents of the first DCI.

14. The apparatus of claim 11, wherein a part of DCI contents of the second DCI is different from DCI contents of the first DCI.

15. The apparatus of claim 11, wherein the processor is further capable of:
determining whether a rescheduling uplink grant is received; and
transmitting, via the transceiver, uplink data according to the rescheduling uplink grant in an event that the rescheduling uplink grant is received,
wherein the second DCI further comprises the rescheduling uplink grant.

16. The apparatus of claim 15, wherein the rescheduling uplink grant indicates a different slot to transmit the uplink data.

17. The apparatus of claim 15, wherein the rescheduling uplink grant indicates a different transmit power to transmit the uplink data.

18. The apparatus of claim 11, wherein the processor is further capable of:
identifying that the second DCI is used to cancel the uplink transmission according to at least one DCI field of the second DCI.

19. The apparatus of claim 11, wherein, in cancelling at least a part of the uplink transmission, the processor is capable of cancelling at least a part of the uplink transmission after a configured number of symbols from receiving the second DCI.

20. The apparatus of claim 11, wherein the processor is further capable of:
performing a part of the uplink transmission before the cancelling.

* * * * *